US008092359B1

(12) United States Patent
Pickering et al.

(10) Patent No.: US 8,092,359 B1
(45) Date of Patent: Jan. 10, 2012

(54) FUSER MEMBER AND FUSER MEMBER SURFACE LAYER

(75) Inventors: Jerry A. Pickering, Hilton, NY (US); Theodora Miller, Rochester, NY (US); Susan C. Baruch, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1873 days.

(21) Appl. No.: 10/691,778

(22) Filed: Oct. 23, 2003

Related U.S. Application Data

(60) Provisional application No. 60/425,647, filed on Nov. 13, 2002.

(51) Int. Cl.
*F16C 13/00* (2006.01)
*G03G 15/20* (2006.01)

(52) U.S. Cl. .............................. 492/56; 492/53; 399/333

(58) Field of Classification Search .................... 492/56, 492/53; 399/333
See application file for complete search history.

(56) References Cited

U.S. PATENT DOCUMENTS 3,669,707 A * 6/1972 Donnelley et al. ............ 427/444
3,795,033 A 3/1974 Donnelly et al.
4,011,362 A 3/1977 Stewart
4,029,827 A 6/1977 Imperial et al.
4,046,795 A 9/1977 Martin
4,101,686 A 7/1978 Strella et al.
4,185,140 A 1/1980 Strella et al.
4,257,699 A 3/1981 Lentz
4,264,181 A 4/1981 Lentz et al.
4,272,179 A 6/1981 Seanor
4,372,246 A 2/1983 Azar et al.
4,503,179 A 3/1985 Yoshimura et al.
4,555,543 A 11/1985 Effenberger et al.
4,568,275 A 2/1986 Sakurai
4,853,737 A 8/1989 Hartley et al.
4,883,717 A 11/1989 Kitamura et al.
5,017,432 A 5/1991 Eddy et al.
5,194,335 A 3/1993 Effenberger et al.
5,217,837 A 6/1993 Henry et al.
5,332,641 A 7/1994 Finn et al.
5,363,180 A 11/1994 Shimizu et al.
5,376,996 A 12/1994 Sankaran
5,464,698 A 11/1995 Chen et al.

(Continued)

FOREIGN PATENT DOCUMENTS

GB 1354471 5/1974

OTHER PUBLICATIONS

Davis et al., U.S. Appl. No. 09/450,302, filed Nov. 29, 1999.

(Continued)

*Primary Examiner* — Sarang Afzali
(74) *Attorney, Agent, or Firm* — Andrew J Anderson

(57) ABSTRACT

A fuser member for toner fusing systems and processes. This fuser member has a fuser base and a fusing surface layer, and the fusing surface layer contains a fluoroelastomer and filler particles. The filler particles have a mean particle diameter greater than 5 microns, and a modulus greater than the modulus of the fluoroelastomer at fusing temperatures. The fusing surface layer has at least the minimum proportion by volume of these particles, with at least the minimum mean particle diameter, that will provide the fusing surface layer with an equilibrium surface roughness so that, in fusing toner to substrate, the fuser member generates an image having a gloss number less than 10.

6 Claims, 2 Drawing Sheets

U.S. PATENT DOCUMENTS

| | | | | |
|---|---|---|---|---|
| 5,508,138 | A | | 4/1996 | Shimizu et al. |
| 5,519,479 | A | | 5/1996 | Shimizu et al. |
| 5,531,813 | A | | 7/1996 | Henry et al. |
| 5,547,742 | A | | 8/1996 | Satoh et al. |
| 5,568,239 | A | | 10/1996 | Furukawa et al. |
| 5,582,917 | A | | 12/1996 | Chen et al. |
| 5,595,823 | A | | 1/1997 | Chen et al. |
| 5,599,631 | A | | 2/1997 | Chen et al. |
| 5,627,000 | A | | 5/1997 | Yamazaki et al. |
| 5,639,549 | A | | 6/1997 | Fukunaga et al. |
| 5,641,603 | A | | 6/1997 | Yamazaki et al. |
| 5,649,273 | A | | 7/1997 | Shimizu et al. |
| 5,729,813 | A | * | 3/1998 | Eddy et al. .................... 399/333 |
| 5,780,545 | A | | 7/1998 | Chen et al. |
| 5,781,840 | A | | 7/1998 | Chen et al. |
| 5,824,416 | A | | 10/1998 | Chen et al. |
| 5,846,447 | A | | 12/1998 | Beatty |
| 5,935,712 | A | | 8/1999 | Tan et al. |
| 5,998,033 | A | | 12/1999 | Tan et al. |
| 6,011,946 | A | | 1/2000 | Eddy et al. |
| 6,090,491 | A | | 7/2000 | Tan et al. |
| 6,114,041 | A | | 9/2000 | Tan et al. |
| 6,159,588 | A | * | 12/2000 | Eddy et al. .................... 428/215 |
| 6,239,223 | B1 | | 5/2001 | Effenberger et al. |
| 6,281,279 | B1 | | 8/2001 | Davis et al. |
| 6,355,352 | B1 | | 3/2002 | Chen et al. |
| 6,361,829 | B1 | | 3/2002 | Chen et al. |
| 6,372,833 | B1 | | 4/2002 | Chen et al. |
| 6,416,819 | B1 | | 7/2002 | Chen et al. |
| 6,419,615 | B1 | * | 7/2002 | Chen et al. ...................... 492/56 |
| 6,429,249 | B1 | | 8/2002 | Chen et al. |
| 6,444,741 | B1 | | 9/2002 | Chen et al. |
| 6,479,158 | B1 | * | 11/2002 | Kuntz et al. ................... 428/447 |
| 2003/0224917 | A1 | * | 12/2003 | Lutz ................................ 492/58 |

OTHER PUBLICATIONS

Pickering, U.S. Appl. No. 10/454,897, filed Jun. 5, 2003.

Pickering et al., U.S. Appl. No. 10/454,900, filed Jun. 5, 2003.

Pickering et al., U.S. Appl. No. 10/691,779, filed Oct. 23, 2003.

Pickering et al., U.S. Appl. No. 10/692,440, filed Oct. 23, 2003.

* cited by examiner

FUSER MEMBER AND FUSER MEMBER SURFACE LAYER

CROSS-REFERENCE TO RELATED APPLICATIONS

This Application claims benefit under 35 USC §119(e) of prior co-pending U.S. Provisional Patent Application Ser. No. 60/425,647, filed Nov. 13, 2002. This provisional patent application is incorporated herein in its entirety, by reference thereto.

Filed concurrently with this application are U.S. application Ser. No. 10/692,440, entitled "Layer Comprising Non-fibrillatable and Autoadhesive Particles, and Method of Preparation", now issued as U.S. Pat. No. 7,056,578, and U.S. application Ser. No. 10/691,779, entitled "Process for Electrostatographic Reproduction", now issued as U.S. Pat. No. 7,195,853. These two concurrently filed applications are incorporated herein in their entireties, by reference thereto.

BACKGROUND OF THE INVENTION

1. Field of the Invention

The present invention relates to electrostatographic imaging and recording apparatus, and to assemblies in these apparatus for fixing toner to the substrates. The present invention relates particularly to a fuser member, and to a fusing surface layer for fuser members, in the toner fixing assemblies.

2. Description of Background and Other Information

Generally in electrostatographic reproduction, the original to be copied is rendered in the form of a latent electrostatic image on a photosensitive member. This latent image is made visible by the application of electrically charged toner.

The toner thusly forming the image is transferred to a substrate—also referred to in the art as a receiver—such as paper or transparent film, and fixed or fused to the substrate. Where heat softenable toners—for example, comprising thermoplastic polymeric binders—are employed, the usual method of fixing the toner to the substrate involves applying heat to the toner, once it is on the substrate surface, to soften it, and then allowing or causing the toner to cool. This application of heat in the fusing process is preferably at a temperature of about 90° C.-220° C.; pressure may be employed in conjunction with the heat.

A system or assembly for providing the requisite heat and pressure customarily includes a fuser member and a support member. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. In cooperating, preferably the fuser and support members define a nip, or contact arc, in which the substrate is positioned or resides, and/or through which the substrate passes. Also as a matter of preference, the fuser and support members are in the form of fuser and pressure rollers, respectively. Yet additionally as a matter of preference, one or both of the fuser and support members have a soft layer that increases the nip, to effect better transfer of heat to fuse the toner.

In contacting toner on the substrate, the surface of the fuser member imparts a surface texture to the toner, and accordingly to the image formed thereby. This surface texture determines the degree of image gloss; differences in the texture of the toner results in varying gloss levels.

With glossy images formed by the indicated fusing process, there are certain disadvantages. Subtle defects can be seen in these images, particularly defects that cause subtle variations in gloss.

However, matte images, or low gloss images, minimize objectionable glare, and they reduce or even hide various image defects, such as oil defects. Particularly, low gloss images can make subtle defects invisible.

Where the receiver is paper, low gloss images are further advantageous in that they do not produce objectionable differential gloss due to nonuniformity in the paper height. Varying types of paper have different levels of roughness, and glossy images produced on rough paper often produce differential gloss. This is particularly a problem in high speed digital printing, where high paper speeds require short fusing times. In the faster printers, when the image is high gloss there is often not time to allow a uniform gloss image on rough papers. As the final operation for fixing the image to the receiver, fusing usually produces the final image surface. Thus, altering the fusing process can be necessary to obtain a desirable image property, such as low image gloss.

Heavily filled silicone rubber, used for fuser member surfaces, is known to produce high quality fused images with the desired low gloss. The polysiloxane elastomers have relatively low surface energies and also relatively low mechanical strengths, but are adequately flexible and elastic. Unfortunately, silicone rubbers wear easily when employed for this purpose; after a period of use, the action of the paper or other media passing through a high pressure nip wears a polysiloxane elastomer fuser surface. The silicone rubbers' low wear resistance as fuser member surfaces accordingly limits fuser member life. Further, although treatment with a polysiloxane release fluid during use of the fuser member enhances its ability to release toner, the fluid causes the silicone rubber to swell. This fluid absorption is a particular factor that shortens fuser member life; fluid treated portions tend to swell and wear and degrade faster. Fuser members with polysiloxane elastomer fusing surfaces accordingly have a limited life.

Fluorocarbon materials also have low surface energies, and, like silicone rubbers, are used as release surface materials for fuser members. Polyfluorocarbons employed for this purpose include nonelastomeric fluorocarbon materials, or fluoroplastics, and fluoroelastomer materials. However, there are disadvantages associated with the use of both.

U.S. Pat. Nos. 5,363,180, 5,508,138, 5,519,479, and 5,649,273 disclose a fixing device which is for use in an electrophotographic apparatus, and which includes a fixing roller. The fixing roller can have a surface layer, with particles harder than the layer dispersed therein. This surface layer can comprise a heat resistant fluororesin such as ethylene tetrafluoride, or a fluorine type heat contracting resin such as tetrafluoroethylene-perfluoroalkylvinylether copolymer.

In fact, the fluorocarbon resins like polytetra-fluoroethylene (PTFE), and copolymers of tetrafluoroethylene (TFE) and perfluoroalkylvinylether (PFA), and fluorinated ethylene propylene copolymers, have excellent release characteristics due to very low surface energies. They also are characterized by high temperature resistance, excellent chemical resistance, and low wear (high abrasion resistance).

However, fluorocarbon resins are less flexible and elastic than polysiloxane elastomers, and are unsuitable for producing high image quality images. Fluorocarbon resins typically have a high modulus, and cannot evenly contact rough papers; they therefore provide varying gloss within the same image.

The high modulus also tends to produce images with high gloss, and contributes to objectionable gloss mottle; specifically, with both a smooth surface and high modulus, there will be high gloss in addition to the objectionable gloss mottle. And correspondingly, the actual gloss values disclosed in U.S. Pat. Nos. 5,363,180, 5,508,138, 5,519,479, and 5,649,273, including those obtained with resin surface layers incorporating titanium oxide or thermally setting polyimide filler, indeed are high.

Fluoroelastomers also have low surface energy. They have excellent wear resistance as fusing member surfaces, providing better durability in this regard than the polysiloxane elastomers, and unlike the silicone rubbers, do not swell when in contact with polysiloxane release fluids. However, due to their relatively greater hardness as compared with that of the silicone rubbers, fluoroelastomers also typically produce objectionably high gloss images.

It would accordingly be desirable to provide a fusing member fluoroelastomer surface which retains the indicated advantages of fluoroelastomers, while also producing low gloss and high quality images as are achieved with silicone rubbers. It would further be desirable that obtaining the requisite low gloss not depend on the properties of the substrate, but rather be accomplished over a range of substrate surface roughness.

Moreover, it is known that the presence of heat conducting inorganic filler particles, in the fluoroelastomer fusing surface layers of fuser members, provides high energy sites for removing toner from the substrate. Increasing the amount of heat conducting filler content in the fusing surface layer, by providing more reactive sites for the toner, therefore increases toner offset, and accordingly also increases contamination of the fuser member. Thus it would yet additionally be desirable that, where heat conducting inorganic filler particles are present in the fluoroelastomer fusing surface layer, the amount of the filler be minimized.

U.S. Pat. Nos. 4,257,699, 4,264,181, and 4,272,179, and U.S. Pat. Nos. 5,017,432, 5,217,837, and 5,332,641, disclose fuser member fluoroelastomer surface layers with inorganic fillers. However, these references do not discuss the provision of low gloss images; they make no mention of generating low gloss as being an intended objective.

SUMMARY OF THE INVENTION

It has been discovered that a fluoroelastomer fusing surface layer, for generating matte images, can be provided by incorporating filler particles in the layer to indent the surface of this layer, and thereby disrupt image gloss. It has further been discovered that the requisite minimum amount, of particles with a minimum mean particle diameter, must be present in the fusing surface layer, to provide the appropriate indentation for producing low gloss images. It has yet additionally been discovered that the fusing surface layer can be configured so that, as it wears away through use in the fusing process, the new emergence of particles incorporated therein maintains the surface indentation that continues generation of low gloss images.

In the toner fusing process, the fuser member of the invention, having a fusing surface layer as indicated, produces a highly desirable low gloss image that does not generate glare. Further, besides the generated image having a low gloss, the gloss is uniform, or at least essentially or substantially uniform. Yet additionally, image defects, such as release oil artifacts and differential wear from skives or sensors contacting the roller surface, are not visible in the low gloss image.

The benefits as indicated are not dependent upon the substrate surface to which the toner is fused. Particularly, they are obtained with paper regardless of its roughness, or whether it is coated or uncoated; at least, low gloss is provided over a range of substrate roughness.

The indicated U.S. Pat. Nos. 5,017,432, 5,217,837, and 5,332,641 do not disclose or suggest, for fluoroelastomer fusing surface layers, a sufficient amount of the disclosed metal oxide fillers, at the stated particle sizes, to effect generation of images having the requisite low gloss. U.S. Pat. Nos. 4,257,699, 4,264,181, and 4,272,179 do not disclose or suggest fluoroelastomer fusing surface layers having the requisite minimum amount, of particles with the necessary minimum mean particle diameter, to achieve this result.

DESCRIPTION OF THE INVENTION

Figure 1:
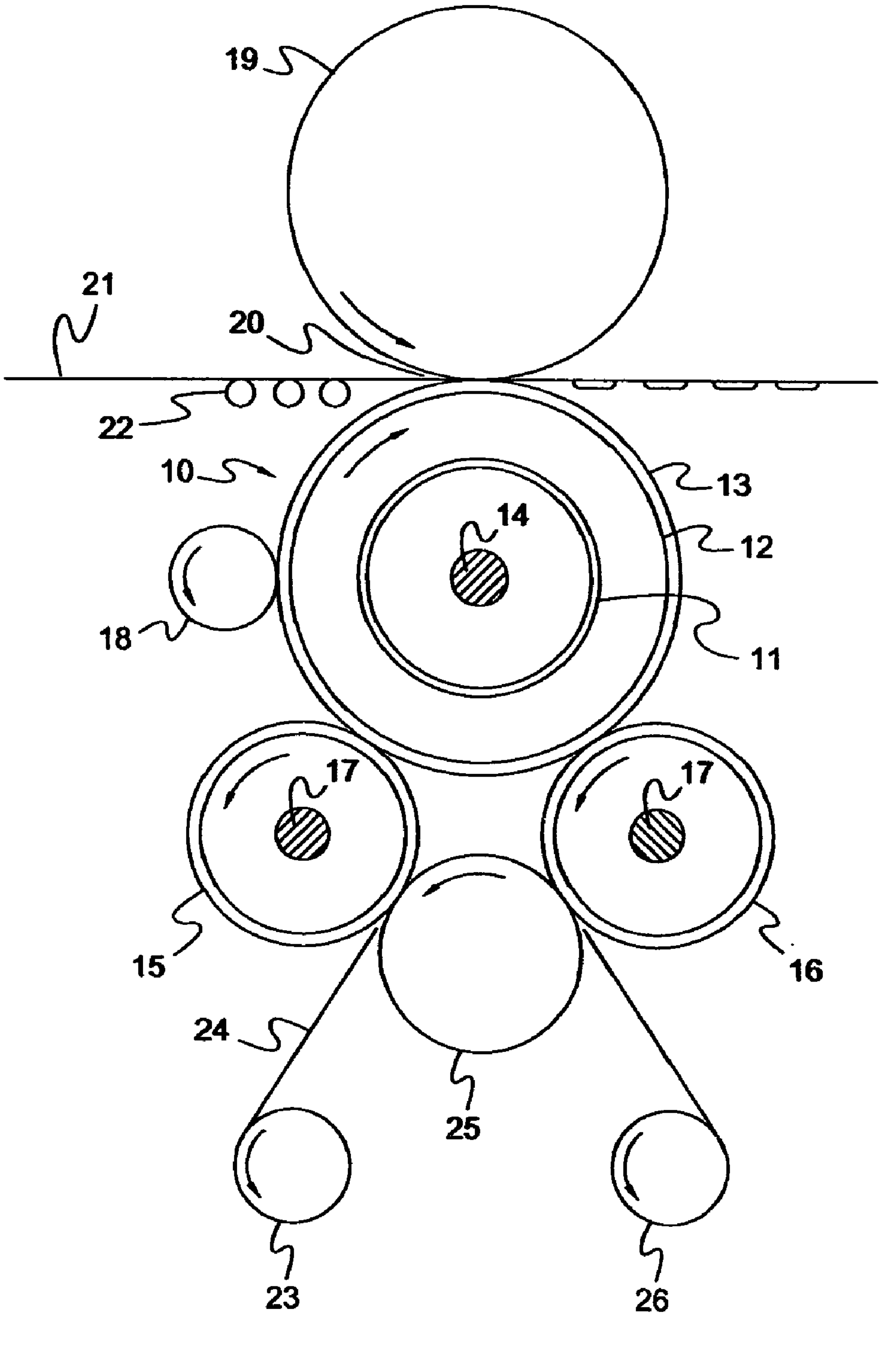
FIG. 1 is a schematic representation, and a sectional view, of a toner fusing assembly of the invention.

Copolymers are understood as including polymers incorporating two monomeric units, i.e., bipolymers, as well as polymers incorporating three or more different monomeric units, e.g., terpolymers, quaterpolymers, etc.

Polyorganosiloxanes are understood as including functional and nonfunctional polyorganosiloxanes. Poly-organosiloxanes further are understood as including polydiorganosiloxanes—i.e., having two organo groups attached to each, or substantially each, or essentially each, of the polymer siloxy repeat units. Polyorganosiloxanes yet further are understood as including polydimethylsiloxanes.

Functional polyorganosiloxanes are understood as being polyorganosiloxanes having functional groups on the backbone, connected to the polysiloxane portion, which can react with fillers present on the surface of the fuser member, or with a polymeric fuser member surface layer or component thereof. Functional polyorganosiloxanes further are understood as being polyorganosiloxanes having functional groups such as amino, hydride, halo (including chloro, bromo, fluoro, and iodo), carboxy, hydroxy, epoxy, isocyanate, thioether, and mercapto functional groups. Nonfunctional polyorganosiloxanes further are understood as being polyorganosiloxanes without groups of the type as indicated.

The term "organo" as used herein, such as in the context of polyorganosiloxanes, includes "hydrocarbyl", which includes "aliphatic", "cycloaliphatic", and "aromatic". The hydrocarbyl groups are understood as including the alkyl, alkenyl, alkynl, cycloalkyl, aryl, aralkyl, and alkaryl groups. Further, "hydrocarbyl" is understood as including both nonsubstituted hydrocarbyl groups, and substituted hydrocarbyl groups, with the latter referring to the hydrocarbyl portion bearing additional substituents, besides the carbon and hydrogen. Preferred organo groups for the polyorganosiloxanes are the alkyl, aryl, and aralkyl groups. Particularly preferred alkyl, aryl, and aralkyl groups are the $C_1$-$C_{18}$ alkyl, aryl, and aralkyl groups, particularly the methyl and phenyl groups.

Unless stated otherwise, modulus is measured as tensile modulus of elasticity, using dynamic mechanical analysis, at a frequency equal to the frequency of the fuser member. The fuser member frequency pertains to the 360° rotation of the member—in the case of fuser members that operate in the fusing process by rotation (e.g., fuser members with bases in the form of cylindrical cores, or of belts on rollers, or of core-mounted plates)—and in the case of other fuser members, to their equivalent movement.

Gloss number is defined as the value measured using a BYK-Gardner (GB-4520 micro-tri-gloss) meter at an angle of 85 degrees from the vertical on a solid toned area. The gloss meter reading is the percentage of white light reflected from a test sample relative to a black glass standard with a refractive index of about 1.567 (This measurement conforms to ASTM D 523 Standard Test Method for Specular Gloss). At 85 degrees, about 99 percent of incident light is reflected by the black glass standard so the gloss number is approximately equal to the percentage of reflected light. A solid toned area is defined as having a reflection density equal to or greater than 1.0 using an X-Rite 404 Reflection Densitometer, from X-Rite Company, Grand Rapids, Mich. For conducting the indicated measurements, 20# bond paper is employed; however, with these procedures, similar results would still be obtained using smoother papers.

The fuser member includes a fuser base, and a fusing surface layer overlaying the fuser base. The fusing surface layer can reside directly on the fuser base. Alternatively, there can be one or more materials and/or layers, including one or more cushion layers, interposed between the fuser base and the fusing surface layer.

The fusing surface layer comprises at least one polyfluorocarbon elastomer, or fluoroelastomer, and filler particles which have (1) a mean particle diameter greater than 5 microns, and (2) a higher modulus than the fluoroelastomer, under the operating conditions—and particularly at the operating temperature, or the fusing temperature, or the fusing process temperature—of the fusing system in which the fuser member is employed. Particularly, the fusing surface layer comprises a polyfluorocarbon elastomer, or fluoro-elastomer, having dispersed therein filler particles with both a mean particle diameter of greater than 5 microns, and also a higher modulus than the fluoroelastomer under fusing operating conditions, and particularly at fusing temperatures, or fusing process temperatures.

Fusing or operating temperatures, or the temperature of the fusing process, are understood as being within the range of from about 90° C., or about 120° C., or about 150° C., to about 200° C., or about 220° C., or about 250° C. The preferred temperatures are generally within the range of from about 120° C. to about 200° C., more preferably from about 150° C. to about 175° C., still more preferably from about 150° C. to about 185° C.

These filler particles, having a mean particle diameter greater than 5 microns and a higher modulus than the fluoroelastomer at the conditions as indicated, are also referred to herein as indentor particles. The indentor particles are those particles that sufficiently indent the surface of the fusing surface layer so as to generate low gloss images during the fusing process. It is the indentation of this surface that provides the requisite disruption of image gloss, to produce matte images.

Preferably, the modulus of the indentor particles is at least about twice the modulus of the fluoroelastomer at the conditions as indicated. Also as a matter of preference, under these conditions the indentor particles have a modulus of at least about $5\times10^7$ Pa.

Suitable indentor particles include inorganic filler particles, particularly heat conducting inorganic filler particles, including carbides, nitrides, and metal oxides. Examples of metal oxides that may be used are $SnO_2$, CuO, ZnO, FeO, $Fe_2O_3$, and $Al_2O_3$. Carbides and nitrides that are appropriate include SiC, WC, and BN.

Suitable indentor particles further include plastic filler particles, particularly heat conducting plastic filler particles. The plastics, particularly with reference to the filler particles as discussed herein, and especially the indentor particles, are understood as including noncrosslinked plastics, and also as including resins, particularly inelastic resins, and crosslinked resins. Fluoroplastics are particularly preferred, as are fluororesins, or nonelastomeric fluorocarbons. Fluororesins that are suitable include polytetrafluoroethylenes (PTFE), and fluorinated ethylene propylenes (FEP), including copolymers of tetrafluoroethylene and hexafluoropropylene, as well as copolymers of tetrafluoroethylene and ethylene, and copolymers of tetrafluoroethylene and perfluoroalkyl vinyl ether (PFA). Preferably the plastics, and particularly the fluororesins, have a number average molecular weight of from about 1,000 to 1,000,000.

With respect to inorganic and plastic filler particles, inorganic filler particles are characterized by high surface energy; as stated, they provide sites to take up toner. Where they are present in the form of indentor particles, their large size, required for performing the indentor function, renders them particularly attractive as potential sites for toner attachment.

U.S. Pat. Nos. 4,257,699, 4,264,181, and 4,272,179, and U.S. Pat. Nos. 5,017,432, 5,217,837, and 5,332,641, all discussed herein, disclose fuser member fluoroelastomer surface layers with inorganic fillers. In most of these instances, the intended purpose of these fillers is to increase thermal conductivity; invariably they have high surface energy and a high degree of hardness. While the propensity for adherence to toner can be minimized, the tendency for toner to stick remains. Moreover, because of the large size required for generating low gloss, inorganic particles serving as indentor particles also have the potential of wearing elements of the toner fusing system, such as sensors and skives, that contact the fuser member surface.

Plastic particles have low surface energy, and correspondingly a low propensity for removing toner from the substrate. In addition to having a much lower propensity than inorganic filler particles for the indicated toner removal, they also do not have the abrasiveness of the inorganic filler particles, and therefore subject sensors and skives, or other such contacting elements, to little or no wear. Nevertheless, the plastic particles themselves have good wear resistance, and also they impart this feature to the fusing surface layer.

It is preferred that the indentor particles are heat conducting. As a matter of particular preference, the heat conducting indentor particles have a greater thermal conductivity than the fluoroelastomer. Generally, the heat conducting inorganic particles have a thermal conductivity much higher than that of the heat conducting plastic particles. The plastic particles that have at least some crystallinity will typically have a higher thermal conductivity, and a higher density, than plastics without crystallinity; examples of the plastics with some crystallinity are the polytetrafluoroethylenes.

The indentor particles may be in one or more of any suitable shapes—irregular, as well as in the form of spheroids, platelets, flakes, powders, ovoids, needles, fibers, and the like. For indentor particles also employed for the purpose of providing thermal conductivity, and particularly in such instance and where internal heating is employed, an irregular shape is more preferred, as are spherical particles and platelets, so as to maximize the heat conducting effect of the filler particles; fibers, needles, and otherwise elongated shapes are less preferred here, unless they are advantageously oriented, because in certain alignments they are less effective for properly conducting heat.

In this regard, elongated particles are more efficient for conducting heat in the proper direction if they are at right angles to the fuser base—radially aligned, if the fuser base is a cylindrical core, belt on rollers, or a core-mounted plate, but less efficient if they are positioned parallel to the core—axially aligned, if the fuser base is a core, a belt, or is core mounted as indicated. Accordingly, to maximize heat conducting properties where elongated heat conducting particles are employed, perpendicular (radial) positioning is preferred, while parallel (axial) alignment may be employed but is not preferred.

So that the fusing surface layer will impart the requisite low gloss during the fusing process, it must contain indentor particles which have a mean particle diameter of a required minimum value; what this required minimum value is depends upon the maximum gloss to be obtained. Moreover, of these indentor particles having a mean particle diameter of a required minimum value, the fusing surface layer must have a minimum proportion by volume, of indentor particles having a minimum mean particle diameter.

As to the indicated minimum value for mean particle diameter, in any event the indentor particles must be greater than 5 microns, as has been indicated. Yet apart from this requirement, it may be necessary that the mean particle diameter have a minimum value even higher than the 5 micron limit.

Specifically, the minimum mean particle diameter depends upon the maximum gloss value to be provided. The lower the maximum gloss, the higher the required minimum value for the indentor particles.

In this regard, for a gloss number of about 10 or less, then the stated mean particle diameter of greater than 5 microns is the required minimum value. However, to provide a maximum gloss number of about 7 or less, then at least about 6.5 microns is the required minimum value. And to provide a maximum gloss number of about 5 or less, then at least about 8 microns is the required minimum value.

Moreover, in addition to this minimum mean particle diameter requirement, to provide gloss at or below a particular gloss value, the proportion by volume of indentor particles that is required depends upon their mean particle diameter, and also, the mean particle diameter of the indentor particles that is required depends upon their proportion by volume in the fusing surface layer. The larger the mean particle diameter, the smaller proportion by volume of indentor particles that is required to generate images of the desired gloss value; the greater the proportion by volume, the smaller mean particle diameter of the indentor particles that is required.

For particles that are too small, no amount thereof is sufficient to provide matte images; this is the reason that only particles with a mean particle diameter greater than 5 microns are indentor particles, for the purpose of the present invention. Additionally, the proportion by volume of indentor particles should not be too great for their mean particle diameter; too large an amount of indentor particles will produce a poor fusing surface layer. For the same reason, the mean particle diameter of the indentor particles should not be too great for the amount of this material that is included in the fusing surface layer.

As stated, for the fusing surface layer to generate an image having a gloss number about 10 or less, the indentor particles must have a mean particle diameter greater than 5 microns. And in accordance with the foregoing, these indentor particles, of mean particle diameter greater than 5 microns, must comprise at least a minimum proportion by volume of the fusing surface layer, and must have at least the minimum mean particle diameter, which will provide the fusing surface layer with a surface roughness that, during the fusing process, generates an image of the gloss as indicated. Particularly, the indicated indentor particles comprise at least a minimum proportion by volume of the fusing surface layer, and have at least the minimum mean particle diameter, which will provide the fusing surface layer with an equilibrium surface roughness that, during the fusing process, generates an image having a gloss number about 10 or less.

For this fusing surface layer—i.e., providing the stated gloss number of about 10 or less—then where the indentor particles have a mean particle diameter of from about 5.5 microns to about 8 microns, they comprise at least about 15 percent by volume, more preferably at least about 20 volume percent by volume, but preferably no more than about 45 percent by volume, of the fusing surface layer of the invention. Where the indentor particles have a mean particle diameter of from about 9 microns to about 15 microns, they comprise at least about 10 percent by volume, more preferably at least about 15 percent by volume, but preferably no more than about 45 percent by volume, of the fusing surface layer of the invention. Where the indentor particles have a mean particle diameter of from about 15 microns to about 25 microns, they comprise at least about 8 percent by volume, more preferably at least about 12 percent by volume, but preferably no more than about 45 percent by volume, of the fusing surface layer of the invention. Where the indentor particles have a mean particle diameter of from about 25 microns to about 55 microns, they comprise at least about 5 percent by volume and preferably no more than about 40 percent by volume, and more preferably at least about 10 percent by volume but preferably no more than about 35 percent by volume, of the fusing surface layer of the invention. Where the indentor particles have a mean particle diameter greater than about 55 microns, they comprise at least about 5 percent by volume and preferably no more than about 35 percent by volume of the fusing surface layer of the invention.

Correspondingly, for the fusing surface layer to generate an image having a gloss number of about 7 or less, the indentor particles must have a mean particle diameter, as stated, of at least about 6.5 microns. And in accordance with the foregoing, these indentor particles, of at least about 6.5 microns mean particle diameter, must comprise at least a minimum proportion by volume of the fusing surface layer, and must have at least the minimum mean particle diameter, which will provide the fusing surface layer with a surface roughness that, during the fusing process, generates an image of the gloss as indicated. Particularly, the indicated indentor particles comprise at least a minimum proportion by volume of the fusing surface layer, and have at least the minimum mean particle diameter, which will provide the fusing surface layer with an equilibrium surface roughness that, during the fusing process, generates an image having a gloss number about 7 or less.

For this fusing surface layer, where the indentor particles have a mean particle diameter of from about 7 microns to about 12 microns, they comprise at least about 15 percent by volume, more preferably at least about 20 percent by volume, but preferably no more than about 45 percent by volume, of the fusing surface layer of the invention. Where the indentor particles have a mean particle diameter of from about 12 microns to about 20 microns, they comprise at least about 10 percent by volume, more preferably at least about 15 percent by volume, but preferably no more than about 45 percent by volume, of the fusing surface layer of the invention. Where the indentor particles have a mean particle diameter of from about 20 microns to about 35 microns, they comprise at least about 10 percent by volume, more preferably at least about 12 percent by volume, but preferably no more than about 40 percent by volume, of the fusing surface layer of the invention. Where the indentor particles have a mean particle diameter of from about 35 microns to about 55 microns, they comprise at least about 8 percent by volume and preferably no more than about 40 percent by volume, and more preferably at least about 10 percent by volume but preferably no more than about 35 percent by volume, of the fusing surface layer of the invention. Where the indentor particles have a mean particle diameter greater than about 55 microns, they comprise at least about 8 percent by volume and preferably no more than about 35 percent by volume of the fusing surface layer of the invention.

And for the fusing surface layer to generate an image having a gloss number of about 5 or less, the indentor particles must have a mean particle diameter, as stated, of at least about 8 microns. Here also the indentor particles—as indicated, of at least about 8 microns mean particle diameter—must comprise at least a minimum proportion by volume of the fusing surface layer, and must have at least the minimum mean particle diameter, which will provide the fusing surface layer with a surface roughness that, during the fusing process, generates an image of the gloss as indicated. Particularly, the indicated indentor particles comprise at least a minimum proportion by volume of the fusing surface layer, and have at least the minimum mean particle diameter, which will provide the fusing surface layer with an equilibrium surface roughness that, during the fusing process, generates an image having a gloss number about 5 or less.

For this fusing surface layer, where the indentor particles have a mean particle diameter of from about 8 microns to about 15 microns, they comprise at least about 15 percent by volume, more preferably at least about 20 percent by volume, but preferably no more than about 45 percent by volume, of the fusing surface layer of the invention. Where the indentor particles have a mean particle diameter of from about 15 microns to about 25 microns, they comprise at least about 12 percent by volume, more preferably at least about 15 percent by volume, but preferably no more than about 45 percent by volume, of the fusing surface layer of the invention. Where the indentor particles have a mean particle diameter of from about 25 microns to about 55 microns, they comprise at least about 10 percent by volume and preferably no more than about 40 percent by volume, and more preferably at least about 12 percent by volume but preferably no more than about 35 percent by volume, of the fusing surface layer of the invention. Where the indentor particles have a mean particle diameter greater than about 55 microns, they comprise at least about 8 percent by volume and preferably no more than about 35 percent by volume of the fusing surface layer of the invention.

Apart from the requirements as stated with respect to the presence of the indentor particles, the fusing surface layer further may include one or more fillers for one or more other purposes. Different fillers may be used for such purposes as conducting heat, improving toner offset and release properties of the fusing surface layer, controlling material properties such as wear resistance and surface roughness, modifying hardness, and imparting other characteristics, such as desired mechanical properties, to the fusing surface layer; among the fillers which may be included are reinforcing fillers. Fillers that are suitable include inorganic fillers such as $SnO_2$, SiC, CuO, ZnO, $Al_2O_3$, FeO, $Fe_2O_3$, WC, BN, and amorphous silica, such as precipitated silica and fumed silica. Further fillers that are suitable include plastic fillers, such as fluororesin particles.

Where the fusing surface layer indeed does include one or more fillers for one or more other purposes, the indentor particles may comprise all, essentially all, substantially all, a portion, essentially none, or none, of the one or more fillers provided for one or more other purposes. These one or more fillers may be present in amounts and/or proportions, and sizes, as are generally known or as can be determined without undue experimentation by those of ordinary skill in the art—insofar as the amounts, proportions, and sizes are not inconsistent with the intended function of the indentor particles. Particularly as to sizes, preferably these one or more fillers have a mean particle diameter of from about 0.1 microns to about 80 microns, more preferably of from about 0.2 microns to about 50 microns. Also, the shapes discussed as being suitable for indentor particles are also appropriate for these one or more fillers.

Filler particles provided for one or more other purposes, as discussed, may comprise filler particles other than the indentor particles. Preferably these other filler particles have a mean particle diameter of 5 microns or less, preferably less than 5 microns. Suitable other filler particles include inorganic particles, elastic particles, and plastic particles.

Proportion ranges, stated as percent by volume values, are set forth herein in conjunction with indentor particle sizes indicated to provide the specified gloss levels. Where, in addition to the indentor particles, there is a sufficient amount of the indicated other filler particles also present in the fusing surface layer—particularly fillers of less than about 3 microns mean particle diameter—then it may be necessary that the stated minimum percent by volume values be increased. Specifically, particles sufficiently small, present in sufficient amounts, tend to increase the gloss of the image generated by the fusing surface layer. The reasons for this effect are that these particles change the manner in which the fuser member surface wears, tending to make it smoother, and also they provide reinforcement to the fusing surface layer, tending to increase its modulus.

Particularly where the indentor particles comprise plastic indentor particles, then in addition to the plastic indentor particles, the fusing surface layer may further include other plastic filler particles, preferably plastic filler particles with a mean particle diameter of 5 microns or less; these other plastic filler particles can be employed in conjunction with the plastic indentor particles for the purpose of improving wear resistance and/or tensile properties. The fusing surface layer filler particles can consist or consist essentially of plastic particles; in a preferred embodiment the fusing surface layer filler particles can consist or consist essentially of plastic indentor particles, while in another preferred embodiment the fusing surface layer filler particles can consist or consist essentially of both plastic indentor particles and plastic filler particles with a mean particle diameter of 5 microns or less.

And where the indentor particles particularly comprise, consist essentially of, or consist of fluororesin particles, then in addition to the fluororesin indentor particles, the fusing surface layer may further include other fluororesin filler particles, preferably fluororesin filler particles with a mean particle diameter of 5 microns or less; these other fluororesin filler particles can be employed in conjunction with the fluororesin indentor particles for the purpose of improving wear resistance and/or tensile properties. The fusing surface layer filler particles can consist or consist essentially of fluororesin particles; in a preferred embodiment the fusing surface layer filler particles can consist or consist essentially of fluororesin indentor particles, while in another preferred embodiment the fusing surface layer filler particles can consist or consist essentially of both fluororesin indentor particles and fluororesin filler particles with a mean particle diameter of 5 microns or less.

Notwithstanding the foregoing, fillers typically are characterized by high surface energy and by a high degree of hardness; inorganic particles in particular customarily have these properties. As discussed, toner tends to adhere to high surface energy particles and fillers, and they tend to abrade toner fusing system elements provided to contact the fuser member.

Accordingly, in general it is desirable to minimize the amount of filler—e.g., inorganic particles—having these properties. Particularly in the case of fillers other than the indentor particles, it is desirable to minimize the amount of these other fillers where they have the indicated high surface energy and hardness properties.

Discontinuous phase material, as disclosed in U.S. application Ser. No. 10/691,779, now U.S. Pat. No. 7,195,853, can also be included in the fusing surface layer. This material can be provided already in final form—e.g., as preformed particulate—or in curable form, like the curable siloxane polymers as discussed herein, to be crosslinked, and thereby converted to final form, by the curing of the fusing surface layer of the invention. Particularly as to curable siloxane polymers, these may be employed in amounts as discussed herein. Further, the discontinuous phase material can be included in the amounts and/or proportions, and sizes, as disclosed in U.S. application Ser. No. 10/691,779, now U.S. Pat. No. 7,195,853. Where discontinuous phase material is included, it may be that the minimum value for indentor particle mean particle diameter, and/or the minimum value for indentor particle proportion by volume in the fusing surface layer—i.e., the minimum values that are required for achieving the desired gloss value—are lower.

The filler—including the inorganic filler and the plastic filler that is employed, and particularly the indentor particles, including the inorganic indentor particles and the plastic indentor particles—preferably is insoluble in the solvents used for preparing the coating preparations of the invention. Discontinuous phase material that, when employed, is already in final form—e.g., preformed particulate—likewise is preferably insoluble. In this regard, these materials preferably are insoluble even to the extent that the solvents cannot make the particles adhere to one another due to softening.

Yet additionally, the indicated filler and final form discontinuous phase material preferably are heat stable at fusing or operating temperatures. Particularly, these materials preferably are heat stable at fusing process temperatures—e.g., within the range of from about 90° C., or about 120° C., or about 150° C., to about 200° C., or about 220° C., or about 250° C. Accordingly, the filler and discontinuous phase material preferably are heat stable at temperatures of up to at least about 90° C., more preferably up to at least about 120° C., still more preferably up to at least about 150° C., still more preferably up to at least about 200° C., still more preferably up to at least about 220° C., or even up to at least about 250° C.

This heat stability entails the absence, or at least the essential absence or substantial absence, of degradation, decomposition, sublimation, and release of byproducts, and of change in shape, size, or state of matter. And indentor particles in particular, in addition to being thusly heat stable, also undergo no melting, or essentially or substantially no melting, at the temperatures as indicated.

For improving the wear resistance and release properties of the fusing surface layer, one or more of the materials which are used for preparing the fusing surface layer, and which are reactive with SiOH groups, may be compounded with a coupling agent—preferably a silane coupling agent, as discussed in U.S. Pat. No. 5,998,033. Materials suitable for this treatment include inorganic fillers, particularly inorganic indentor particles, and cocuratives.

As to this matter, herein it is disclosed that the materials which are compounded, for subsequent combination with solvent and formation of the fusing surface layer, include the fluoroelastomer. Where the layer also incorporates inorganic indentor particles, they as well are included in the dry compounding treatment. And if additional inorganic filler and cocurative are being employed, they also may be included in this treatment. Accordingly, where one or more SiOH group-reactive materials, as indicated, are present, the requisite amount of coupling agent yet additionally can be included in the compounding of these materials.

Instead of compounding with coupling agent, one or more of the SiOH group-reactive materials may be surface treated with a coupling agent—here also preferably a silane coupling agent, as discussed in U.S. Pat. Nos. 5,935,712, 6,090,491, and 6,114,041. The coupling agent can be dissolved in an appropriate solvent, and surface treatment can be effected by steeping the material in this solution; ultrasonication can be employed during this treatment. After treatment the material is washed and dried. In the case of silane, preferably the treatment solution is prepared by adding about 2 weight percent of this coupling agent to a solvent comprising 95 percent by volume ethanol and 5 percent by volume water, and stirring for ten minutes. The material is covered by the solution and ultrasonicated for ten minutes. The material then is separated by vacuum filtration, rinsed with ethanol, and thereafter oven dried at 150° C., for 18 hours under reduced pressure (vacuum).

It is understood that both the surface treatment and the compounding, as discussed, are included in referring to treatment with coupling agent. It is further understood that both material compounded with silane coupling agent, and material surface treated with silane coupling agent, are included in referring to the resulting product as silane coupling agent-treated material.

Particularly as to the silane coupling agents, 3-aminopropyltriethoxysilane is a silane which may be employed. However, the secondary amine functional silanes are preferred, because they have relatively less of an unfavorable impact upon pot life. Suitable secondary amine functional silanes include N-phenylaminopropyltrimethoxysilane, N-phenylamino-propyltriethoxysilane, 3-[2-N-benzylaminoethylaminopropyltri-methoxysilane, and 3-[2-N-benzylaminoethylaminopropyltri-ethoxysilane. Also among the silanes that may be used are the styryl-functionalized silane coupling agents disclosed in U.S. Pat. No. 6,090,491.

U.S. Pat. Nos. 5,998,033, 5,935,712, 6,090,491, and 6,114,041 are incorporated herein in their entireties, by reference thereto.

Yet other additives and adjuvants also may be used with the fluoroelastomer, as long as they do not affect the integrity thereof, or significantly interfere with an activity intended to occur in the layer—such as the crosslinking of the fluoroelastomer. These further additives and adjuvants, where present, are provided in amounts and proportions as are generally known or as can be determined without undue experimentation by those of ordinary skill in the art. Suitable examples include crosslinking agents, processing aids, accelerators, polymerization initiators, and coloring agents.

Equilibrium surface roughness, of the fusing surface layer, is the surface roughness where the degree of roughness remains unchanged, or essentially unchanged, as use of the fuser member in the fusing process proceeds. At equilibrium surface roughness, wearing away of the fusing surface layer at its surface regenerates a surface with the same, or essentially the same, degree of roughness.

A factor in providing the equilibrium surface roughness is the indentor particles being uniformly, or at least essentially uniformly, distributed in the fusing surface layer, or in the fluoroelastomer. Taking the fusing surface layer at a cross section—i.e., starting at the top, or surface, of the layer, and extending downwardly toward the fuser base to the bottom of this layer—that portion of the fusing surface layer which provides an equilibrium surface roughness, as the layer is worn away by use, is characterized by the indicated uniformity, or at least essential uniformity, of distribution; particularly, in this cross section all the components of the fusing surface layer preferably are distributed uniformly, or at least essentially uniformly, in the fusing surface layer, and in this cross section preferably the fusing surface layer is homogeneous, or at least essentially homogeneous, in composition.

Where the surface roughness, of the fusing surface layer of the invention, is not already at equilibrium surface roughness at the top of the layer, or at the beginning or outset of use in the fusing process, then during use the layer wears away to the point at which it reaches equilibrium surface roughness. The particular method disclosed herein, for preparing the fusing surface layer, results in a layer which is characterized by uniform, or at least essentially uniform, dispersion of the indentor particles—and which correspondingly provides equilibrium surface roughness—throughout the layer, except at the very top.

Specifically, this method leaves the layer with an uppermost portion, or artifact, which is not at equilibrium surface roughness. When this artifact is worn away, such as by use in the fusing process, the fusing surface layer is at equilibrium surface roughness.

In fact—rather than being left with the artifact to be worn away by use—the fusing surface layer obtained from the preparation method disclosed herein can be subjected to a surface finishing treatment, so that it indeed does exhibit equilibrium surface at its very top, or at the beginning of use. For instance, the layer can be subjected to a suitable grinding or abrading procedure to achieve this result.

Where the fusing surface layer is not thusly characterized by equilibrium surface roughness from the outset, it nevertheless may—depending upon its composition—generate an image at or below the requisite maximum gloss prior to the equilibrium being reached; it even may be that the sufficiently low degree of gloss is generated at the beginning of use and continuing thereafter—i.e., is provided by the very top of the layer, and still provided as the layer wears away—even where the layer is not yet at equilibrium surface roughness. Nevertheless, regardless of whether the layer is producing the gloss as indicated before equilibrium surface roughness is reached, it does so at this equilibrium.

The fuser base may be any of those as are known in the art. As a suitable embodiment, the fuser base may be a core in the form of a cylinder or a cylindrical roller, particularly a hollow cylindrical roller. In this embodiment the fuser base may be made of any suitable metal, such as aluminum, anodized aluminum, steel, nickel, copper, and the like. Also appropriate are ceramic materials and polymeric materials, such as rigid thermoplastics, and thermoset resins with or without fiber enforcement. Preferably the roller is an aluminum tube or a flame sprayed aluminum coated steel tube.

Alternatively, the fuser base may be a plate. Materials suitable for the core may also be used for the plate.

One embodiment of a fuser base in the plate form is a curved plate mounted on a larger cylindrical roller—that is, larger than a cylindrical roller which itself is employed as a fuser core. Being thusly curved, the plate accordingly has the shape of a portion of a cylinder. Additionally, the plate can be removably mounted on the cylindrical roller, so that the plate can be replaced without also requiring replacement of the roller. In this embodiment, the properties discussed herein with reference to the fuser base pertain only to the portion of the cylindrical roller occupied by the attached plate; the rest of this roller is not involved in the fusing of toner to substrate.

As yet another alternative, the fuser base may be a belt, particularly an endless flexible belt. A thin belt made of a suitable metal, such as those indicated for the core and plate forms; the belt may also be made of a polyamide or a polyimide, particularly a heat resistant polyamide or polyimide. A polyimide material appropriate for the belt is commercially available under the trademark Kapton, from DuPont High Performance Films, Circleville, Ohio.

Preferably the belt is mounted on rollers, which can be cores of the type as discussed herein. As a matter of preference two rollers are utilized with the belt, each of these two rollers defining a different one of the curves around which the belt passes.

A support member for the fusing system and process likewise may be any of those as are known in the art; particularly, it can be a backup roller, also referred to as a pressure roller. The support member can be in the form of a roller, plate, or belt, in the same manner as is suitable for the fuser base; particularly, cores suitable for the fuser member may also be used for the support member. Where the support member is a belt, preferably it is mounted on rollers, in the same manner as—for the fuser base in the form of a belt.

In any of the indicated forms, the support member may have mounted thereon a cushion for forming the nip with the fuser member. Suitable cushion materials include those having at least some degree of temperature resistance, such as silicone and EPDM elastomers. In the absence of yet a further layer in turn being mounted on the cushion, this cushion also serves to contact the substrate, and accordingly to cooperate with the fuser member.

Alternatively or in addition to the cushion, the support member may have mounted thereon a thin fluoroplastic surface layer, such as a Teflon or PFA layer, overlaying the surface that cooperates with the fuser member. Where both the cushion and the thin fluoroplastic surface layer are present on the support member, the cushion is situated between the support member and the surface layer.

Preferably the fuser base is in the form of a cylindrical roller, with the fuser member correspondingly in the form of a roller—specifically, a fuser roller. Also as a matter of preference, the support member comprises a backup roller.

Internal heating and/or external heating may be employed in the toner fusing system and process. Heating means as are known in the art are suitable. Preferably, the means of providing heat for fusing toner and substrate comprise the heating of the fuser member by one or more external and/or internal heating sources, and transmission of this heat from the fuser member to the toner, or to both toner and substrate—preferably by contact.

Where there are one or more materials and/or layers, including one or more cushion layers, interposed between the fuser base and the fusing surface layer, they may be those as are known in the art. Where there is at least one cushion layer, the at least one cushion layer can include one or more thermally conductive cushion layers and/or one or more thermally nonconductive cushion layers.

When used, the at least one cushion layer particularly can be that as disclosed in U.S. application Ser. No. 09/879,585, filed Jun. 12, 2001; this application is incorporated herein in its entirety, by reference thereto. Generally, the thickness of the at least one cushion layer is about 20 millimeters or less, preferably from about 1 to about 10 millimeters.

Among the materials which can be used for the at least one cushion layer are suitable silicone elastomers, such as appropriate thermally conductive silicone elastomers and thermally nonconductive silicone elastomers. Addition cure, condensation cure, and peroxide cure silicone elastomers can all be used, with addition cure silicone elastomers and condensation cure silicone elastomers being preferred.

Further, silicone elastomers formulated as room temperature vulcanizate (RTV), liquid injection moldable (LIM), and high temperature vulcanizate (HTV) silicone elastomers can be used. RTV and LIM silicones are preferred.

A highly desired property for the silicone elastomers is heat stability. Particularly for cushion layer silicone elastomers, this property is characterized by low compression set, resistance to hardening or softening over time, and resistance to tear propagation from heat aging.

In particular, compression set is permanent deformation. Low compression set, or good compression set resistance, is required for the desired shape of the fuser roller to be maintained.

Two particular silicone elastomers which may be used are Silastic™-J silicone, from Dow Corning Corporation, Midland, Mich., and a silicone commercially available under the designation EC4952 from Emerson & Cuming ICI, Billerica, Mass.

In a process which may be used for application of at least one cushion layer, the fuser base optionally can first be degreased and surface roughened. If these functions are performed, they may be accomplished by grit blasting. Except as discussed otherwise herein, the fuser base surface, whether or not initially degreased and roughened, is primed with conventional primer, such as Dow™ 1200 RTV Prime Coat primer, from Dow Corning Corporation, and material for forming a cushion is subsequently applied thereto.

To form a cushion layer, silicone elastomer is molded, particularly by injection, or extruded or cast onto the fuser base to the desired thickness. Curing is then effected. For a RTV silicone, this is accomplished by allowing it to sit at room temperature.

After curing, conventionally the silicone layer is subjected to a post cure, which improves compression set resistance. Typically a post cure is conducted at a temperature of around 200° C., or about 150-200° C., or about 200-230° C., or as high as about 240° C., for a period of about 1-2 hours, or for about 4 hours, or for about 24 hours, or for a period of about 4-48 hours.

Each silicone cushion layer is subjected to cure, and preferably also to post cure, before application of the next layer, except in the case of the last silicone layer to be laid down. For this finally applied silicone cushion layer, the fluoroelastomer composition is first laid down and then cured at a raised temperature for a period of time, as discussed herein.

This curing of the fluoroelastomer composition serves as the post cure for the silicone cushion layer on which it is deposited. Delaying the post cure of the last cushion layer in this manner allows maximum adhesion between the cushion and the fusing surface layer to develop.

Where only one silicone cushion layer is employed, since it is also the last cushion layer to be laid down, it is not post cured until the fluoroelastomer layer is applied, in accordance with the foregoing.

Before the polyfluorocarbon elastomer or fluoroelastomer composition for forming the fusing surface layer is applied, the cushion material can be ground to a desired profile, depending upon the paper handling concerns to be addressed. For instance, a cylinder shape, or a crown, or barrel, or bow tie, or hourglass profile may be provided.

Addition cure silicone elastomers typically employ a platinum catalyst; condensation cure silicone elastomers, a tin catalyst. Tin catalysts will poison platinum catalysts, but the reverse is not true. Accordingly, where sequential addition and condensation cure silicone elastomer layers are employed, a condensation cure layer can be applied onto an addition cure layer, but not vice versa.

Suitable fluoroelastomers for the fusing surface layer include random polymers comprising two or more monomeric units, with these monomeric units comprising members selected from a group consisting of vinylidene fluoride [$-(CH_2CF_2)-$], hexafluoropropylene [$-(CF_2CF(CF_3))-$], tetra-fluoroethylene [$-(CF_2CF_2)-$], perfluorovinylmethyl ether [$-(CF_2CF(OCF_3))-$], and ethylene [$-(CH_2CH_2)-$]. Among the fluoroelastomers that may be used are fluoroelastomer copolymers comprising vinylidene fluoride and hexafluoro-propylene, and terpolymers as well as tetra- and higher polymers including vinylidene fluoride, hexafluoropropylene, and tetrafluoroethylene monomeric units. Additional suitable monomers include perfluorovinylalkyl ethers, such as perfluorovinylmethyl ether.

Preferred fluoroelastomers include random polymers comprising the following monomeric units:

$-(CH_2CF_2)_x-$, $-(CF_2CF(CF_3))_y-$, and $-(CF_2CF_2)_z-$, wherein x is from about 30 to about 90 mole percent, y is from about 10 to about 60 mole percent, and z is from about 0 to about 42 mole percent.

Further preferred fluoroelastomers are random polymers comprising the following monomeric units:

$-(CH_2CH_2)_x-$, $-(CF_2CF(OCF_3))_y-$, and $-(CF_2CF_2)_z-$, wherein x is from about 0 to about 70 mole percent, y is from about 10 to about 60 mole percent, and z is from about 30 to about 90 mole percent The fluoroelastomers, as discussed, may further include one or more cure site monomers. Among the suitable cure site monomers are 4-bromoperfluorobutene-1, 1,1-dihydro-4-bromo-perfluorobutene-1,3-bromoperfluorobutene-1, and 1,1-dihydro-3-bromoperfluoropropene-1. When present, cure site monomers are generally in very small molar proportions. Preferably, the amount of cure site monomer will not exceed about 5 mole percent of the polymer.

The fluoroelastomer molecular weight is largely a matter of convenience, and is not critical to the invention. However, as a matter of preference, the fluoroelastomers have a number average molecular weight of from about 10,000 to about 200,000. More preferably they have a number average molecular weight of from about 50,000 to about 100,000.

Among the fluoroelastomers that may be used are those that are plastic at ambient temperature and elastomeric at fusing or operating temperatures.

Commercially available fluoroelastomers which may be used are those sold under the trademark Viton® by Dupont Dow Elastomers, Stow, Ohio; they include Viton® A, Viton® B, Viton® E, Viton® GF, Viton® GH, Viton® GFLT, Viton® B 50, Viton® B 910, Viton® E 45, Viton® E 60C, and Viton® E 430. Also suitable are the Tecnoflons®, such as T838K, FOR-THF, FOR-TFS, FOR-LHF, NM, FOR-60KIR, TH, TH505, and FOR4391, from Ausimont USA, Inc., Thorofare, N.J., and the Fluorel™ fluoro-elastomers, such as FE5840Q, FX9038, FX2530, FLS5840Q, FLS2690, FC2230, FC2145, FT2430, Fluoroel 2170, Fluorel 2174, Fluorel 2177, Aflas (a polypropylene-tertafluoroethylene), and Fluorel II L11900 (a polypropylene-tetrafluoroethylene vinylidene fluoride), from Dyneon L.L.C., Oakdale, Minn.

Appropriate fluoroelastomers include those as identified in U.S. Pat. Nos. 4,372,246, 5,017,432, 5,217,837, and 5,332,641. These four patents are incorporated herein in their entireties, by reference thereto.

The Viton® A, Viton® GF, FE5840Q, and FX9038 fluoroelastomers are particularly preferred.

Fluoroelastomer preferably comprises from about 20 percent by volume to about 70 percent by volume of fluoroelastomer compositions used to prepare coating preparations of the invention. Fluoroelastomer likewise preferably comprises from about 20 percent by volume to about 70 percent by volume of fusing surface layers of the invention.

For preparation of the fusing surface layer, or fluoroelastomer layer, one or more curing agents or curatives are employed in a suitable amount to effect curing of the fluoroelastomer. Suitable curatives for the fluoroelastomer include nucleophilic addition curing systems. Also appropriate as curatives are free radical initiator curing systems.

Preferred nucleophilic addition curing systems for the fluoroelastomer are the bisphenol curing systems. These preferably include at least one bisphenol crosslinking agent and at least one accelerator.

Suitable bisphenol crosslinking agents include 4,4-(hexafluoroisopropylidene)diphenol, also known as bisphenol AF, and 4,4-isopropylidenediphenol. Accelerators which may be employed include organophosphonium salt accelerators such as benzyl triphenylphosphonium chloride.

The amount of bisphenol crosslinking agent used, and likewise the amount of accelerator used, each is preferably from about 0.5 parts to about 10 parts per 100 parts by weight of the fluoroelastomer. A bisphenol curing system, taken as a whole, is employed in an amount, based on the total weight of crosslinking agent and accelerator, likewise of from about 0.5 parts to about 10 parts per 100 parts by weight of the fluoroelastomer. A commercially available bisphenol curing system which may be used is Viton® Curative No. 50 from Dupont Dow Elastomers, which is a combination of bisphenol AF and one or more quaternary phosphonium salt accelerators; this curative preferably is used in an amount of from about 2 parts to about 8 parts per 100 parts by weight of the fluoro-elastomer.

Further nucleophilic addition curing systems are polyfunctional hindered curing systems, particularly diamine curing systems. Among the diamine curing systems that may be employed are diamine carbamate curing systems. Examples of these are hexamethylenediamine carbamate and N,N'-dicinnamylidene-1,6-hexanediamine; these are commercially available as DIAK No. 1 and DIAK No. 3, respectively, from E.I. Du Pont de Nemours, Inc. DIAK No. 4 is another polyfunctional hindered diamine curing system that may be used.

Free radical initiator curing systems which may be used include peroxide free radical initiator curing systems. Preferably these comprise at least one peroxide free radical initiator, and at least one suitable crosslinking agent; peroxides that may be employed for this purpose include the suitable aliphatic peroxides.

Particular peroxides which may be used include ditertiary butyl peroxide, dicumyl peroxide, 2,4-dichlorobenzoyl peroxide, 2,5-dimethyl-2,5-di(t-butyl peroxy)hexane, dibenzoyl peroxide and the like. Particular crosslinking agents suitable for these systems include triallyl cyanurate, triallyl isocyanurate, and others known in the art.

Where the curative comprises a nucleophilic addition curing system or a free radical initiator curing system, one or more cocuratives may also be employed. In this regard, the use of these systems for curing fluoroelastomers can generate hydrogen fluoride. Accordingly, acid acceptors for neutralizing the hydrogen fluoride are suitable cocuratives. Preferred examples of these acid acceptors are the Lewis bases, particularly inorganic bases such as alkali and alkaline earth metal bases. Preferred bases include magnesium oxide, zinc oxide, lead oxide, calcium oxide, and hydroxides including calcium hydroxide, magnesium hydroxide, potassium hydroxide and sodium hydroxide. Hydrides may also be employed including sodium borohydride and lithium aluminum hydride.

Also suitable as a cocurative is the cocurative system disclosed in U.S. application Ser. No. 09/450,302, filed Nov. 29, 1999. This application is incorporated herein in its entirety, by reference thereto.

The amount of cocurative which is used preferably is from about 2 parts to about 20 parts per 100 parts by weight of the fluoroelastomer. Particularly where one or more acid acceptors are employed, the amount used is preferably that which is sufficient to neutralize the indicated hydrogen fluoride and allow for complete crosslinking.

An excessive amount of cocurative, particularly in the case of the more basic curatives such as calcium hydroxide, will shorten the life of the fluoroelastomer solution used to prepare the fusing surface layer, as discussed herein. Specifically, cocurative excess will cause rapid viscosity increase and solution gellation; however, this is not a problem if solution coating is not used.

Magnesium oxide, calcium hydroxide, and zinc oxide are preferred acid acceptors. Particularly for solution coatings, magnesium oxide and zinc oxide are preferred acid acceptors.

A fluoroelastomer composition, such as is used for preparing the fluoroelastomer solution or dispersion of the invention, can comprise the fluoroelastomer and the indentor particles. It can also include one or more of those of the foregoing curative, cocurative, additional filler, adjuvant, and additive components that are being employed.

In particular embodiments, this composition can comprise the fluoroelastomer and indentor particles, or the fluoroelastomer and cocurative, or the fluoroelastomer, indentor particles, and cocurative. Any of these embodiments of the fluoroelastomer composition further can include one or more of the curative, additional filler, adjuvant, and additive components as indicated.

The indicated fluoroelastomer composition may be formed by any means suitable for combining the components. An appropriate dry compounding method is preferred.

Where the fusing surface layer employs inorganic indentor particles, they are included in the dry compounding treatment. Where plastic indentor particles are used, they may be included in the dry compounding if they are sufficiently robust to this treatment, so that it does not alter their shape or reduce their size, and if their inclusion in the dry compounding does not cause uneven dispersion of the dry compounded composition in the subsequently prepared coating solution or dispersion; such uneven dispersion would result in a lumpy, unusable fusing surface layer. However, preferably plastic indentor particles are instead added to the solution or dispersion formed from the dry compounded materials, as discussed herein.

Particularly in the case of polytetrafluoroethylene particles, where these plastic particles are used, they are added to the indicated solution or dispersion, rather than to the prior dry compounding treatment. The polytetrafluoro-ethylene particles in fact do not sufficiently retain their shape and size when subjected to the dry compounding. Further, the presence of even 5 parts polytetrafluoroethylene particles per 100 parts by weight of the fluoroelastomer causes the indicated uneven dispersion and lumpiness.

Dry compounding may be conducted with a two roll mill. It may be carried out at a temperature of from about 40° F. to about 200° F., or from about 50° F. to about 100° F. However, preferably the compounding is carried out at approximately room temperature, for example, from about 50° F. to about 70° F. (from about 10° C. to about 21° C.), more preferably from about 55° F. to about 65° F. (from about 13° C. to about 28° C.). This operation tends to generate heat, so preferably a mill with its operating temperature inhibited by some means, such as by water cooling, is employed. The materials are compounded until a uniform, dry, flexible composite sheet is obtained.

With a fluoroelastomer that, as discussed, is plastic at ambient temperature, the milling operation may be facilitated by raising the temperature at which the compounding is conducted to the softening point of this elastomer. However, with this type of fluoroelastomer, dry compounding may not be practical, in which case combination in solution is preferred. Solvents that are suitable for this purpose include those employed for forming the fusing member layer.

Commercially provided fluoroelastomers often come with curatives already incorporated therein. However, for solution coating it is preferred that the curative not be provided in this manner, but rather be employed as a separate component.

Although curative, as such a separate component, may be dry compounded with the other indicated components, preferably it is not, but rather is subsequently added to the solution or dispersion which is prepared using the dry compounded materials, as discussed herein. Specifically, the curative may be added directly to the solution or dispersion prior to coating. Withholding the curative thusly for addition to the final coating solution or dispersion greatly extends the shelf life of this solution or dispersion.

For forming the requisite layer on the fuser member, the fluoroelastomer composition can be combined with suitable solvent. Specifically in the case of the fluoroelastomer composition obtained from dry compounding, this composition is divided into pieces and added to a sufficient amount of one or more solvents to provide a solution, or a dispersion, wherein the indentor particles are uniformly, or at least essentially uniformly, distributed.

As noted, where plastic indentor particles are used, preferably they are added to the indicated solution or dispersion. Also as a matter of preference, where plastic indentor particles are used, and particularly where the plastic is a fluororesin, the solution or dispersion is prepared using milling media—e.g., ceramic or metallic milling media, such as spheres, beads, pellets, or cylindrical milling media—in order to facilitate the incorporation of the plastic particles into the solvent. The particular purpose for this use of milling media is ultimately to provide uniform, or at least essentially uniform, distribution of the indentor particles in the fusing surface layer.

Further components may also be employed. Although they can be included in the dry compounding, preferably they are added to the solvent.

For instance, one or more of the polydiorganosiloxane oligomers, particularly the α, ω difunctional polydiorganosiloxanes, disclosed in U.S. Pat. No. 4,853,737, may be used; this patent is incorporated herein in its entirety, by reference thereto. These polydiorganosiloxanes may be employed in the amount of from about 0.1 grams to about 5 grams per 100 grams of solution.

Further, discontinuous phase material, if employed, may be added here. In this regard, one or more of the curable siloxane polymers, particularly the curable polyfunctional poly($C_{1-6}$ alkyl)siloxane polymers, disclosed in U.S. Pat. No. 5,582,917, may be used; this patent is incorporated herein in its entirety, by reference thereto. A preferred commercially available curable siloxane polymer is SFR-100 silicone, from GE Silicones, Waterford, N.Y. The one or more curable siloxane polymers can be employed in the amount of up to about 50 parts, or up to about 60 parts, or up to about 80 parts, or up to about 100 parts, per 100 parts by weight of the fluoroelastomer. Particularly, the one or more curable siloxane polymers may be used in the amount of from about 5 parts, or about 10 parts, to about 50 parts, or about 60 parts, or about 80 parts, or about 100 parts, per 100 parts by weight of the fluoroelastomer. The curing of the fusing surface layer of the invention effects crosslinking of the curable siloxane polymer that is present.

If both polydiorganosiloxane oligomer and curable siloxane polymer, as discussed, are employed, it is preferable that they be kept separate prior to addition to the fluoroelastomer, because these polydiorganosiloxane oligomers catalyze the crosslinking of the curable siloxane polymers.

Still further, one or more yet additional additives and/or adjuvants can be added to the solution or dispersion, such as defoaming agents, wetting agents, and other materials. These yet additional adjuvants and fillers, where present, are provided in amounts and proportions as are generally known or as can be determined without undue experimentation by those of ordinary skill in the art.

The amount of solvent used is preferably that which will provide a solution or dispersion having a solids content of from about 10 weight percent to about 50 weight percent, more preferably from about 10 weight percent to about 30 weight percent. Suitable solvents include esters, ketones, and acetates. Ketones that can be used include acetone, methyl ethyl ketone (MEK), and methyl isobutyl ketone. Preferred esters are the $C_1$-$C_8$ acetates, such as the $C_2$-$C_8$ acetates—e.g., ethyl acetate, n-propyl acetate, isopropyl acetate, n-butyl acetate, isobutyl acetate, t-butyl acetate, and sec-butyl acetate. Most preferably the solvent is MEK.

One or more solvents may be employed. Particularly, a mixture of two or more solvents can be used.

For instance, a solvent that can be used is one comprising about 50 weight percent each of methyl ethyl ketone and methyl isobutyl ketone. Yet other solvents which may be used are blends of methyl ethyl ketone and methanol (MeOH), such as blends comprising about 85 percent by weight methyl ethyl ketone and about 15 percent by weight methanol (85:15 MEK:MeOH). Methanol is used to extend the solution life of the coating, or to improve the coating quality.

What is accordingly obtained is a coating composition or preparation—e.g., a coating solution or a coating dispersion—for preparing a fusing surface layer of the invention. With curative being present therein as indicated, it can be designated a curable composition.

The solution or dispersion may be applied to the fuser base in a succession of thin coatings, either as discrete layers or as a continuous buildup of layers. Application is by any suitable means, such as dipping, spraying, or transfer coating.

A method of dipping is ring coating. To conduct ring coating, the roller is drawn up through a larger diameter hole machined in two plates, a top plate and a bottom plate. Between the plates is a flexible gasket which forms a liquid tight seal with the roller surface and the top plate. The coating solution is poured into a well created by the roller, the flexible gasket, and the top plate. The roller is drawn up through the gasket and the solution coats the outside of the roller surface. In this manner a minimal amount of solution is used to coat each roller.

After it is applied, each coating is allowed to stand, at room temperature or higher, in order to flash off all or at least most of the solvent. For instance, following each application of a coating layer, evaporation of solvent is effected at temperatures of from about 25° C. to about 90° C. or higher.

When the desired thickness is obtained the resulting layer is cured. Preferably, the layer is heated to a temperature of from about 150° C. to about 250° C. and held for 12 to 48 hours. To prevent bubbling of the layer, either sufficient drying time is allowed for the indicated solvent flash off or evaporation to be completed, or the ramp to cure temperature—i.e., from room temperature to the stated 150° C.-250° C. upper limit—is extended over a period of 2 to 24 hours.

The number of coatings applied to form the fusing surface layer is that which will provide the appropriate thickness, which can be within a range as is conventional in the art. Specifically, the fusing surface layer can be of a thickness as is suitable for the systems and processes in which it is employed, and the requisite thickness for particular instances can be determined without undue experimentation.

Further as to fusing surface layer thickness, one factor to consider, with respect to the acceptable minimum thickness, is whether there is a cushion interposed between the fusing surface layer and fuser base. The presence of an intermediate compliant layer allows for stretching of the fusing surface layer during use. Accordingly, in addition to normal wear that is occurring, the delamination effect acting on the fusing surface layer is magnified. And the thicker the cushion interposed between fusing surface layer and base, the more this effect is magnified.

As to the foregoing, where the fusing surface layer of the invention resides right on the fuser base, then there is no deformability to magnify the delamination effect. In this instance, the fusing surface layer can be as thin as about 12 microns.

However, where there is a cushion layer or layers interposed between fusing surface layer and base, then if the total thickness of the intermediate compliant layer or layers is less than or equal to about 2500 microns, the surface layer should have a thickness of not less than about 25 microns. And if the total thickness of the intermediate compliant layer or layers is greater than about 2500 microns, then the fusing surface layer should be at least about 38 microns thick.

There are also factors to consider as to preferred maximum fusing surface layer thicknesses in various circumstances. For instance, if internal heating is employed in the fusing process, then the fusing surface layer must not be so thick as to impede heat transfer impermissibly, and thereby cause the base or core temperature to become excessive. Accordingly, even where the fusing surface layer is directly adjacent to the base, the layer preferably is not thicker than about 400 microns.

Where there is no internal heating, then the fusing surface layer can be thicker. In these circumstances the fusing surface layer can be as thick as about 1000 microns, or even thicker; theoretically there is no thickness upper limit, subject to considerations of cost and processing limitations.

However, if the fusing surface layer of the invention is being provided by a solution or dispersion coating method, such as the method discussed herein, then this factor is likely to put a practical upper limit on thickness. Because of the restricted amount of coating deposited by each application, then a point is reached where multiple iterations become operationally difficult. Accordingly, solution or dispersion coating methods as are known generally limit the surface layer to a thickness of about 500 microns or less.

The fusing surface layer of the invention may be provided by methods, other than solution coating, which are suitable. For instance, appropriate extrusion coating methods may be used.

The fuser member of the invention can be used in toner fusing systems and processes where, during operation, release agent is applied to the fusing surface layer so that this agent contacts toner on the substrate, and can also contact the substrate, during the operation of the fuser member. Particularly where the fuser base is a cylindrical roller or an endless belt, the release agent is applied, while the base is rotating or the belt is running, upstream of the contact area between fuser member and substrate toner.

If employed, release agent preferably is applied so as to form a film on the fusing surface layer. As a matter of particular preference, the release agent is applied so as to form a film that completely, or at least essentially or at least substantially, covers the fusing surface layer. Also as a matter of preference, during operation of the system the release agent is applied continuously, or at least essentially or at least substantially continuously, to the fusing surface layer.

Release agents are intended to prohibit, or at least lessen, offset of toner from the substrate to the fusing surface layer. In performing this function, the release agent can form, or participate in the formation of, a barrier or film that releases the toner. Thereby the toner is inhibited in its contacting of, or even prevented from contacting, the actual fusing surface layer, or at least the fluoroelastomer thereof.

The release agent can be a fluid, such as an oil or a liquid, and is preferably an oil. It can be a solid or a liquid at ambient temperature, and a fluid at operating temperatures. Also as a matter of preference, the release agent is a polymeric release agent, and as a matter of particular preference, is a silicone or polyorganosiloxane oil.

Suitable release agents are those disclosed in U.S. Pat. Nos. 5,824,416, and 5,780,545. These two patents are incorporated herein in their entireties, by reference thereto.

Further as to this matter, release agents which may be used include polymeric release agents having functional groups. Appropriate polymeric release agents with functional groups include those which may be found as liquids or solids at room temperature, but are fluid at operating temperatures.

Particular functional group polymeric release agents which may be used include those disclosed in U.S. Pat. Nos. 4,011,362, 4,046,795, and 5,781,840; these patents also are incorporated herein in their entireties, by reference thereto. Still further release agents which may be used are the mercapto functional polyorganosiloxanes disclosed in U.S. Pat. No. 4,029,827, and the polymeric release agents having functional groups such as carboxy, hydroxy, epoxy, amino, isocyanate, thioether, and mercapto functional groups, as disclosed in U.S. Pat. Nos. 4,101,686 and 4,185,140; yet additionally these patents are incorporated herein in their entireties, by reference thereto.

Preferred release agents with functional groups include the mercapto functional polyorganosiloxane release agents and the amino functional polyorganosiloxane release agents. Particularly preferred are the release agents, including mecapto functional polyorganosiloxane release agents, consisting of, consisting essentially of, consisting substantially of, or comprising monomercapto functional polyorganosiloxanes, or polyorganosiloxanes having one mercapto functional group per molecule or polymer chain. Also particularly preferred are release agents, including amino functional polyorganosiloxane release agents, consisting of, consisting essentially of, consisting substantially of, or comprising monoamino functional polyorganosiloxanes, or polyorganosiloxanes having one amino functional group per molecule or polymer chain. In this regard, the release agents disclosed in U.S. Pat. Nos. 5,531,813 and 6,011,946 may be used; these patents are incorporated herein in their entireties, by reference thereto.

Additional preferred release agents are the fluoro functional polyorganosiloxanes, including those with fluoroalkyl, such as trifluoroalkyl (e.g. trifluoropropyl) functionality, and fluorosilicones, and polyorganosiloxanes having fluorine-containing groups, as disclosed in U.S. Pat. Nos. 5,568,239, 5,627,000, and 5,641,603. These patents also are incorporated herein in their entireties, by reference thereto. The fluoro functional polyorganosiloxanes are particularly preferred where the indentor particles of the fusing surface layer comprise fluoroplastic and/or fluororesin indentor particles.

Further with regard to the functional agents, one point to consider is that because of their expense usually they are diluted with nonfunctional polyorganosiloxanes, particularly nonfunctional polydimethylsiloxanes. Another point is that for obtaining good release activity with a functional release agent, monofunctionality is preferred, so that the molecule cannot react both with toner and with the fusing surface layer, and thereby serve as a toner/fuser member adhesive. Therefore, the functional agent would ideally consist of entirely, or at least consist essentially, of the monofunctional moiety. However that also is impractical, also because of expense.

Therefore, the functional polyorganosiloxane preferably comprises as great a proportion of the monofunctional moiety as is practically possible. As a matter of particular preference, the functional polyorganosiloxane has a sufficient monofunctional proportion so as not to act as the indicated adhesive.

Accordingly, a preferred release agent composition comprises a blend of nonfunctional polyorganosiloxane, particularly nonfunctional polydimethylsiloxane, with amino functional polyorganosiloxane, and the amino functional polyorganosiloxane comprises monoamino functional polyorgano-siloxane. Another preferred release agent composition comprises a blend of nonfunctional polyorganosiloxane, particularly nonfunctional polydimethylsiloxane, with mercapto functional polyorganosiloxane, and the mercapto functional polyorganosiloxane comprises monomercapto functional polyorganosiloxane.

The release agent may be applied to the fuser member by any suitable applicator, including sump and delivery roller, jet sprayer, etc. Those means as disclosed in U.S. Pat. Nos. 5,017,432 and 4,257,699 may be employed; the latter of these two patents is incorporated herein in its entirety, by reference thereto. Preferably the present invention employs a rotating wick oiler or a donor roller oiler.

A rotating wick oiler comprises a storage compartment for the release agent and a wick for extending into this compartment. During operation of the toner fusing system of the invention, the wick is situated so as to be in contact with the stored release agent and also with the fusing surface layer of the fuser member; the wick thusly picks up release agent and transfers it to the fuser member.

A donor roller oiler includes two rollers and a metering blade, which can be a rubber, plastic, or metal blade. One roller meters the oil in conjunction with the blade, and the other transfers the oil to the fuser roller. This type of oiler is common in the art, and is frequently used with fuser members having fluoroelastomer fusing surface layers.

The release agent is applied to the substrate, particularly in the case of paper, preferably at a rate of from about 0.1 to about 20 microliters, more preferably at a rate of about 1.0 to about 8 microliters, per 8" by 11" copy. The applicator accordingly is adjusted to apply the release agent at this rate.

A toner fusing system of the invention is shown in FIG. 1. Multilayered fuser roller 10 comprises, in sequential order, a fuser base 11, in the form of a hollow cylindrical roller, as well as a cushion layer 12 and a fusing surface layer 13. Fusing surface layer 13 has $Al_2O_3$ indentor particles (not depicted in FIG. 1) dispersed therein. Internal heating member 14, an optional element in the invention, is disposed in the hollow portion of fuser base 11.

External heating members 15 and 16 are in the form of hollow cylindrical rollers; their rotational directions, and the rotational directions of all the other rotating elements, is shown by their respective arrows. The rotational directions as depicted can all be reversed.

External heating members 15 and 16 are heated by respective heating lamps 17. These two contact heating members are spaced apart by a distance less than the diameter of fuser member 10, which is in contact with both. Contact heating members 15 and 16 transfer heat to fuser member 10 by their contact with fusing surface layer 13.

Rotating wick oiler 18 applies release agent to fusing surface layer 13.

Support member 19, in the form of a backup roller, cooperates with fuser member 10 to form fusing nip or contact arc 20. Copy paper or other substrate 21, carrying unfused toner images 22, passes through fusing nip 20 so that toner images 22 are contacted by fusing surface layer 13. Support member 19 and fuser member 10 act together to apply pressure to the paper 21 and toner 22, and fuser member 10 also provides heat, with the heat and pressure serving to fuse toner 22 to the paper 21.

Dispensing roller 26 incrementally feeds cleaning web 24 over advance roller 25, to be rolled up onto collecting roller 23. In passing along roller 25, web 24 contacts and cleans contact heating members 15 and 16.

Cleaning web 24 is a polyamide material. A polyamide web which may be employed for this purpose is commercially available under the trademark Nomex® from BMP of America, Medina, N.Y. Any other suitable cleaning material may be employed instead.

In place of the indicated cleaning assembly, any other means or apparatus appropriate for cleaning the contact heating members may be employed. Alternatively, the contact heating members can be provided with a nonstick coating. This coating can be a fluoroplastic, and it can include a heat conducting filler. Where the contact heating members have a nonstick coating the means for cleaning these members can be omitted.

Figure 2:
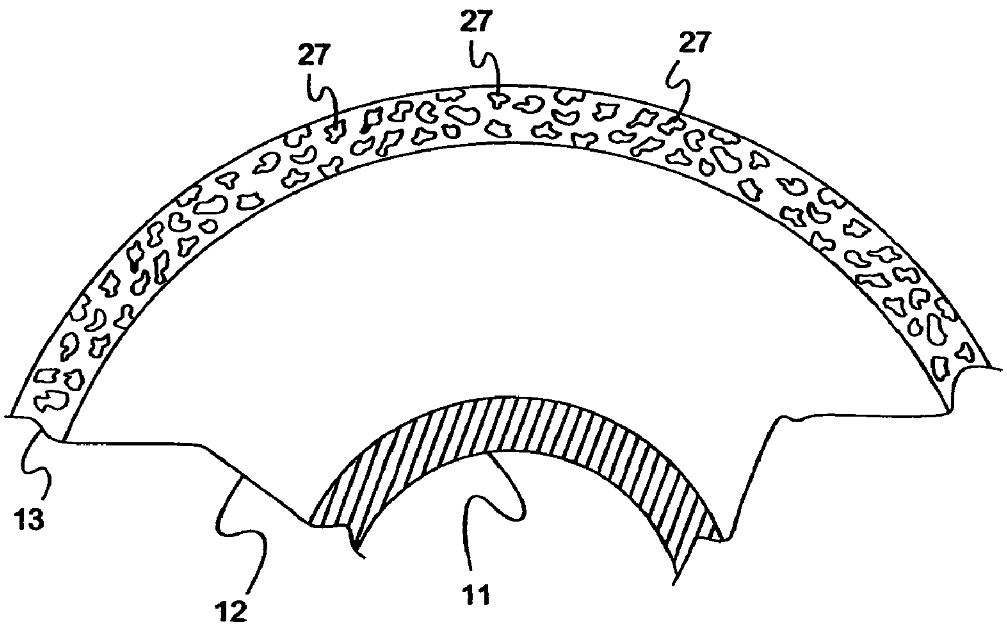
FIG. 2 is a schematic representation, and an enlarged fragmentary sectional view, of an embodiment of the fuser member of the invention.

FIG. 2 shows a fragmentary view of an embodiment of fuser member 10, magnified to show the multiple layers in greater detail. Polytetrafluoroethylene indentor particles 27 are distributed through fusing surface layer 13.

Figure 3:
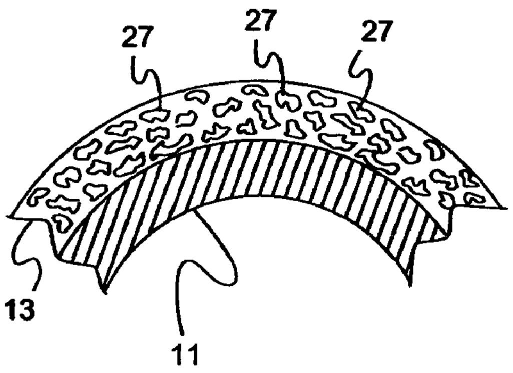
FIG. 3 is a schematic representation, and an enlarged fragmentary sectional view, of another embodiment of the fuser member of the invention.

FIG. 3 shows a fragmentary view of another embodiment of fuser member 10, also magnified to show greater detail. In this embodiment there is no cushion, and fusing surface layer 13 resides directly on fuser base 11.

The invention is illustrated by the following procedures; these are provided for the purpose of representation, and are not to be construed as limiting the scope of the invention. Unless stated otherwise, all percentages, parts, etc. are by weight.

Experimental Procedures

Materials Employed in the Procedures

Viton® A fluoroelastomer, a copolymer of vinylidene fluoride and hexafluoropropylene $Fe_2O_3$ (7098), approx. 0.7 microns mean particle diameter, from Harcros Pigments Inc., Easton, Pa.

$Al_2O_3$ (AL7131), approx. 5 microns mean particle diameter, from Norton Materials, Worcester, Mass.

$Al_2O_3$ (T-64), approx. 12 microns mean particle diameter, from Whitaker Clark & Daniels, Inc., South Plainfield, N.J.

$Al_2O_3$ (AL601 and AL602), approx. 12 microns mean particle diameter and approx. 20 microns mean particle diameter, respectively, from Atlantic Equipment Engineers, Bergenfield, N.J.

Carbon black (Thermax), from R.T. Vanderbilt Company Inc., Norwalk, Conn.

PTFE (M-270), approx. 50 microns mean particle diameter, from Shamrock Technologies Inc., Newark, N.J.

Dow™ 1200 RTV Prime Coat primer, from Dow Corning Corporation. A metal alkoxide type primer containing light aliphatic petroleum naptha (85 weight percent), tetra(2-methoxy-ethoxy)silane (5 weight percent), tetrapropyl orthosilicate (5 weight percent), and tetrabutyl titanate (5 weight percent)

Silastic™-J 60 Shore A addition cure RTV silicone rubber, from Dow Corning Corporation EC4952 65 Shore A condensation cure RTV silicone rubber, from Emerson & Cuming ICI PS513 α, ω3-aminopropyldimethylsiloxy terminated poly-dimethylsiloxane, from United Chemical Technologies, Inc., Bristol, Pa.

60,000 centistoke DC200 polydimethylsiloxane, from Dow Corning Corporation

MgO (Maglite™-Y), from Merck/Calgon Corp., Teterboro, N.J.

Viton® Curative No. 50, from Dupont Dow Elastomers

Catalyst 50, from Emerson & Cuming ICI

SFR-100 silicone, from GE Silicones

Preparation of Fluoroelastomer Compositions

Viton® A and MgO, in amounts as set forth in Table 1, and filler, of the types and in the amounts as also identified in Table 1, were thoroughly compounded on a water cooled two roll mill at 63° F. (17° C.). For each composition, compounding was conducted until a uniform, dry composite sheet was obtained. The sheet was removed and stored until used for the preparation of a coating solution.

TABLE 1

| Composition No. | Viton ®A (grams) | MgO (grams) | Filler (type) | Filler (grams) |
|---|---|---|---|---|
| 1 | 400 | 48 | $Fe_2O_3$ | 664 |
| 2 | 300 | 36 | $Al_2O_3$ (AL7131) | 123.6 |
| 3 | 500 | 60 | Carbon Black | 5 |
| 4 | 300 | 36 | $Al_2O_3$ (AL601) | 174.9 |
| 5 | 300 | 36 | $Al_2O_3$ (AL602) | 174.9 |
| 6 | 200 | 24 | $Al_2O_3$ (T-64) | 82.4 |
| 7 | 300 | 36 | $Al_2O_3$ (T-64) | 174.9 |

Preparation of Fuser Members

The foregoing fluoroelastomer compositions were used to prepare the fuser rollers of Comparative Examples 1-5 and Examples 1-2 in the manner as set forth below.

Comparative Example 1

A cylindrical stainless steel fuser core was cleaned with dichloromethane and dried. The core was then primed with a uniform coat of Dow™ 1200 RTV Prime Coat primer. Silastic™-J silicone rubber, parts A and B, were then mixed, injection molded onto the core, and cured at 232° C. for 2 hours under 75 tons/inch$^2$ of pressure.

The roller was then removed from the mold and baked in a convection oven with a temperature ramp increasing to 232° C. substantially uniformly over 24 hours, and this temperature then being maintained for an additional 24 hours. After air cooling, EC4952 silicone rubber was blade coated directly onto the Silastic™-J silicone rubber layer, then cured for 12 hours at about 210° C., followed by 48 hours at 218° C. in a convection oven. After air cooling, the EC4952 silicone layer was ground to a thickness of 0.457 mm (0.018 inches), and the thusly layered fuser core was corona discharge treated for 1 minute at 300 watts.

The resulting product was a fuser core with a cushion made up of a Silastic™-J silicone layer having a thickness of 4.572 mm (0.180 inches), overlaid by an EC4952 silicone layer having the thickness as indicated. To prepare for coating the fluoroelastomer fusing surface layer thereon, the cushion was wiped with isopropyl alcohol.

A fluoroelastomer solution was prepared by dividing 80 grams of Composition 1 into pieces, and placing this material in a glass jar with 120 grams of MEK, to dissolve the Composition 1 material in the MEK. The jar was sealed, placed on its side on the indicated roll mill, and rotated to effect gentle stirring. For subsequent addition of materials—in this Comparative Example, and in the following Examples and Comparative Examples—the jar was taken off the roll mill, unsealed, addition was effected, the jar was again placed on it side on the mill, and rotation to provide gentle stirring was resumed. This stirring was continued until initiation of ring-coating, as discussed below.

Specifically for this Comparative Example, 0.83 grams of PS513 and 1.63 grams of Viton® Curative No. 50 were added to the solution. 30 minutes after addition of the PS513 and the Viton® Curative No. 50, the fluoroelastomer solution was ring-coated onto the corona discharge treated roller thrice, allowing the coating to dry between coats. The thusly-coated roller was cured by ramping the temperature from room temperature to 230° C. over a 12 hour period, and then holding the temperature at 230° C. for 24 hours.

The thickness of the fluoroelastomer coating was measured by removing a small portion of the roller surface and measuring the layer thickness by optical microscopy. By this method, the coating was determined to be 3.9 mils thick.

Comparative Example 2

A fuser roller was prepared in substantially the same manner as that of Comparative Example 1, except with 60 grams of Composition 2 in place of Composition 1, and with 140 grams of MEK, 0.9 grams of PS513, and 2.72 grams of Viton® Curative No. 50, instead of the amounts specified in Example 1. The thickness of the fluoroelastomer coating was measured by the same manner as in Comparative Example 1, and determined to be 3.78 mils thick.

Comparative Example 3

A fuser roller was prepared in substantially the same manner as that of Comparative Example 1, except with 17.3 grams of Composition 3 in place of Composition 1, and with 72.85 grams of MEK, 0.4 grams of PS513, and 1.47 grams of Viton® Curative No. 50, instead of the amounts specified in Example 1. The thickness of the fluoroelastomer coating was measured by the same manner as in Comparative Example 1, and determined to be 2.56 mils thick.

Example 1

A fuser roller was prepared in substantially the same manner as that of Comparative Example 1, except with 30 grams of Composition 4 in place of Composition 1, and with 60 grams of MEK, 0.4 grams of PS513, and 1.23 grams of Viton® Curative No. 50, instead of the amounts specified in Example 1. The thickness of the fluoroelastomer coating was measured by the same manner as in Comparative Example 1, and determined to be 4.45 mils thick.

Example 2

A fuser roller was prepared in substantially the same manner as that of Comparative Example 1, except with 15 grams of Composition 5 in place of Composition 1, and with 60 grams of MEK, 0.4 grams of PS513, and 1.23 grams of Viton® Curative No. 50, instead of the amounts specified in Example 1. The thickness of the fluoroelastomer coating was measured by the same manner as in Comparative Example 1, and determined to be 3.95 mils thick.

Example 3

A fuser roller was prepared in substantially the same manner as that of Comparative Example 1, except for the following differences. Specifically, 65 grams of Composition 6 were employed instead of 80 grams of Composition 1. Further, 155 grams of MEK, 2.123 grams of PS513, and 2.95 grams of Viton® Curative No. 50 were employed, instead of the amounts of these materials as specified in Example 1. Yet additionally, in place of adding the PS513 and Viton® Curative No. 50 30 minutes before ring coating, the following sequence was employed: the 2.123 grams of PS513 were added to the solution of Composition 6 in MEK; 24 hours after this addition of PS513, 21.23 grams of SFR-100 were added; 7 hours after addition of the SFR-100, the Viton® Curative No. 50 was added; and the ring coating was conducted 30 minutes after addition of the Viton® Curative No. 50. The thickness of the fluoroelastomer coating was measured by the same manner as in Comparative Example 1, and determined to be 4.64 mils thick.

Example 4

A fuser roller was prepared in substantially the same manner as that of Example 3, except with 36 grams of Composition 7 in place of 65 grams of Composition 6, and with 84 grams of MEK, 1.08 grams of PS513, 1.526 grams of Viton® Curative No. 50, and 10.8 grams of SFR-100, instead of the amounts of these materials as specified in Example 3. The thickness of the fluoroelastomer coating was measured by the same manner as in Comparative Example 1, and determined to be 4.3 mils thick.

Example 5

A fuser roller core with a cushion was prepared in substantially the same manner as that of Comparative Example 1. A fluoroelastomer solution was prepared by dissolving 50 grams of Composition 3 in 122 grams of MEK, along with 30 grams of PTFE particles in a ceramic crock with cylinderical milling media. 1.0 grams of PS513 and 3.1 grams of Viton® Curative No. 50 were added to the solution. 30 minutes after addition of the PS513 and the Viton® Curative No. 50, the fluoroelastomer solution was ring-coated onto the corona discharge treated roller thrice, allowing the coating to dry between coats. The thusly-coated roller was cured by ramping the temperature from room temperature to 230° C. over a 12 hour period, and then holding the temperature at 230° C. for 24 hours. The thickness of the fluoroelastomer coating was measured by the same manner as in Comparative Example 1, and determined to be 3.4 mils thick.

Example 6

A fuser roller was prepared in substantially the same manner as that of Example 5, except with 125 grams of MEK, 15 grams of PTFE particles, and 0.86 grams of PS513, instead of the amounts specified in Example 5. The thickness of the fluoroelastomer coating was measured by the same manner as in Comparative Example 1, and determined to be 2.7 mils thick.

Fuser Roller Testing

To compare the respective performances of the fuser rollers of the Comparative Examples and Examples, these rollers were each employed with a Heidelberg Digimaster™ 9110 (HD9110) electrophotographic fusing system. In every instance unfused toner was applied to a paper substrate in the HD9110 system, with the roller being employed in the fixing of the toner to the paper.

The release oil of the HD9110 fuser was changed from the standard 60,000 cSt release fluid to a blend of 87.5 weight percent DC200 and 12.5 weight percent of an α-3-aminopropyldimethylsiloxy, ω-trimethylsiloxy terminated poly-dimethylsiloxane with a number average molecular weight of 12,000. The rate of application was 2.0 milligrams per copy. The fuser set point temperature was increased by 30° F. for the fuser members of Examples 4, 5, and 6. Otherwise, all materials, hardware and set points used to compare the indicated fuser rollers were consistent with the Heidelberg Digimaster™ 9110 system.

Each roller was placed in the fuser, and the HD9110 system was run with standard 20# bond paper using a variety of toned images. At print count measurements of about 10,000, about 200,000, and about 300,000, special short runs were employed for conducting gloss level and toner contamination tests; in this regard, the tests at about 10,000 prints actually were conducted between 0 prints and 10,000 prints, while the tests at about 200,000 prints and at about 300,000 prints were conducted within about 20,000 prints of the count—i.e., between about 180,000 and about 220,000 prints, and between about 280,000 and about 320,000 prints, respectively.

The fuser rollers of Comparative Examples 1-3 and Examples 1-6 were tested for gloss level of the generated image. The fuser rollers of Comparative Example 3 and Examples 1, 2, 5, and 6 were also tested for toner contamination.

1. Gloss Level

Gloss was measured in terms of gloss number, using the procedure and devices as discussed herein for determining this value.

2. Toner Contamination

Fuser roller contamination rate was measured at the indicated 200,000 print level. The special short run for this purpose was 2500 prints. After this print run, toner offset to the cleaning web of the Digimaster™ 9110 system was measured to determine contamination.

As to collection of toner on the cleaning web surface, in the Digimaster™ 9110 system the fuser roller is heated by contact with two external aluminum heater rollers that are heated by internal lamps. Toner offset from the paper is removed from the fuser roller by the heater rollers, by virtue of the high surface energy of the anodized aluminum surface of the heater rollers. A thin Nomex® cleaning web is used to remove toner offset from the heater rollers by contact with both. The configuration of the indicated system elements is that as shown in FIG. 1.

Contamination of the cleaning web was determined by measuring and averaging the optical transmission density of toner collected on the cleaning web surface. Optical transmission density was measured using an X-Rite 310 Transmission Densitometer, from X-Rite Company.

The density of the toner offset collected by the cleaning web estimates the offset rate of the fuser. As discussed herein, this offset acts as contamination, and accordingly offset rate indicates the degree of contamination. Therefore, the density of this offset on the web is a measure of the degree of contamination.

Clean webs were used to set the measured optical transmission density to zero. With respect to contamination, cleaning web transmission densities below 0.3 are excellent, at 0.31 to 0.5 are good, at 0.51 to 0.79 are marginal, and at 0.8 and above are unacceptable.

As to these values, a higher web transmission density indicates an increased fuser offset rate, and thusly a greater degree of contamination. Contamination leads to offset on electrostatographic apparatus parts and on images, and yet additionally reduces roller life.

The values obtained from the gloss and contamination tests are set forth in Table 2 below.

TABLE 2

| | Particle size* | Filler level** | SFR-100*** | Gloss**** 10K | 200K | 300K | Contamination at 200K |
|---|---|---|---|---|---|---|---|
| Comp. Ex. 1 | 0.7 | 35 | 0 | 19 | 18 | 16.5 | — |
| Comp. Ex. 2 | 5.0 | 15 | 0 | 14 | 14.5 | 15 | — |
| Comp. Ex. 3 | NA | 0 | 0 | 7.3 | 7 | 7.6 | 0.71 |
| Ex. 1 | 12 | 20 | 0 | 5.9 | 2.4 | — | 0.78 |
| Ex. 2 | 20 | 20 | 0 | 6.2 | 2.5 | — | 0.65 |
| Ex. 3 | 12 | 15 | 50 | 5.7 | 4.7 | 4.9 | — |
| Ex. 4 | 12 | 20 | 50 | 4.9 | 3.4 | 3.5 | — |
| Ex. 5 | 50 | 33 | 0 | 3 | 2.7 | 2.4 | 0.38 |
| Ex. 6 | 50 | 20 | 0 | 5.4 | 3.7 | 3.4 | 0.42 |

*in microns
**as percent by volume of fusing surface layer
***as parts per 100 parts by weight of Viton ®A
****at the indicated print count
— not measured The foregoing results demonstrate that small fillers, at or below 5 um, produce a high gloss. Examples 1 and 2 show that 12 um and 20 um $Al_2O_3$ inorganic particles easily produce a low equilibrium gloss. The low gloss is accompanied by high contamination. Examples 3 and 4 show that the use of 12 um $Al_2O_3$ inorganic particles, in conjunction with SFR-100 soft domain material, also produces low gloss. Examples 5 and 6 show that 50 um PTFE plastic particles produce a low gloss as well as improved contamination values. The improvement in contamination is achieved despite the fact that plastic particles are less thermally conductive than metal oxide particles. In addition, the plastic particles maintain a low gloss, as shown over several hundred thousand copies, indicating that the particles are not eroded and smoothed during use.

Finally, although the invention has been described with reference to particular means, materials, and embodiments, it should be noted that the invention is not limited to the particulars disclosed, and extends to all equivalents within the scope of the claims.

What is claimed is:

1. A fuser member for a toner fusing system or process comprising:

(a) a base; and (b) a fusing surface layer comprising:

(i) a fluoroelastomer; and (ii) filler particles comprising polytetrafluoroethylene filler particles, with a modulus greater than the modulus of the fluoroelastomer at the fusing temperature, and with a mean particle diameter of at least about 50 microns, in at least the minimum proportion by volume of the fusing surface layer, and with at least the minimum mean particle diameter, so that, in fusing toner to substrate, the fuser member generates an image having a gloss number of about 5 or less.

2. The fuser member of claim 1, wherein the filler particles, with a modulus greater than the modulus of the fluoroelastomer of at the fusing temperature, and with a mean particle diameter of at least about 50 microns, comprise at least the minimum proportion by volume of the fusing surface layer, and have at least the minimum mean particle diameter, which provide the fusing surface layer with an equilibrium surface roughness so that, in fusing toner to substrate, the fuser member, at the equilibrium surface roughness, generates an image having a gloss number of about 5 or less.

3. The fuser member of claim 2, wherein the filler particles, with a modulus greater than the modulus of the fluoroelastomer at the fusing temperature, comprise from about 10 percent by volume to about 40 percent by volume of the fusing surface layer.

4. The fuser member of claim 2, wherein the filler particles, with a modulus greater than the modulus of the fluoroelastomer at the fusing temperature, comprise from about 8 percent by volume to about 35 percent by volume of the fusing surface layer, and have a mean particle diameter greater than about 55 microns.

5. The fuser member of claim 1, wherein the plastic filler particles, with a modulus greater than the modulus of the fluoroelastomer at the fusing temperature, comprise from about 10 percent by volume to about 40 percent by volume of the fusing surface layer.

6. The fuser member of claim 1, wherein the plastic filler particles, with a modulus greater than the modulus of the fluoroelastomer at the fusing temperature, comprise at least about 12 percent by volume of the fusing surface layer.

* * * * *